US010595455B2

(12) United States Patent
Foster et al.

(10) Patent No.: US 10,595,455 B2
(45) Date of Patent: Mar. 24, 2020

(54) PLANNING SYSTEM FOR AN AUTONOMOUS WORK VEHICLE SYSTEM

(71) Applicants: CNH Industrial America LLC, New Holland, PA (US); Autonomous Solutions, Inc., Mendon, UT (US)

(72) Inventors: Christopher Alan Foster, Mohnton, PA (US); John Henry Posselius, Ephrata, PA (US); Nathan Eric Bunderson, Providence, UT (US); Taylor Chad Bybee, Logan, UT (US); Daniel John Morwood, Petersboro, UT (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 124 days.

(21) Appl. No.: 15/627,279

(22) Filed: Jun. 19, 2017

(65) Prior Publication Data

US 2018/0359906 A1 Dec. 20, 2018

(51) Int. Cl.
*A01B 69/04* (2006.01)
*G05D 1/02* (2006.01)
(Continued)

(52) U.S. Cl.
CPC ......... *A01B 69/008* (2013.01); *G05D 1/0217* (2013.01); *G05D 1/0219* (2013.01);
(Continued)

(58) Field of Classification Search
CPC .. G05D 1/008; G05D 2201/02; G05D 1/0274; G05D 2201/0201; G05D 1/024; G05D 1/0257; G05D 1/0297; G05D 1/0214; G05D 1/0291; G05D 1/0212; G05D 1/0219; G05D 1/0248; G05D 1/0278; G05D 1/0027; G05D 1/0246; G05D 1/0255; G05D 1/027; G05D 1/0272; G05D 1/0276;
(Continued)

(56) References Cited

U.S. PATENT DOCUMENTS 6,606,542 B2 8/2003 Hauwiller et al.
7,010,425 B2 3/2006 Gray et al.
(Continued)

OTHER PUBLICATIONS

Vougioukas, "A Distributed Control Framework for Motion Coordination of Teams of Autonomous Agricultural Vehicles", Biosystems Engineering, vol. 113, No. 3, Nov. 2012, pp. 284-297. (Year: 2012).*

(Continued)

*Primary Examiner* — Todd M Melton
(74) *Attorney, Agent, or Firm* — Rebecca L. Henkel; Rickard K. DeMille (57) ABSTRACT

A planning system for an autonomous work vehicle system includes a controller configured to determine a plan for the autonomous work vehicle system by reducing a cost function, and to output one or more signals indicative of the plan and/or instructions to execute the plan. The plan includes a route of the autonomous work vehicle system through a field, and the cost function includes multiple costs associated with operation of the autonomous work vehicle system.

20 Claims, 6 Drawing Sheets

(51) Int. Cl.
  *G06Q 50/02* (2012.01)
  *G06Q 10/06* (2012.01)

(52) U.S. Cl.
  CPC ..... *G05D 1/0223* (2013.01); *G06Q 10/06313* (2013.01); *G06Q 50/02* (2013.01); *G05D 2201/0201* (2013.01)

(58) Field of Classification Search
  CPC ...... A01B 69/008; A01B 79/005; B60Q 1/26; B60Q 1/28; B60Q 1/30; B60Q 1/50; B60Q 1/525; G08G 1/202; G08G 1/20; G08G 1/005; G08G 1/056; G08G 1/096816; G08G 1/96838; G08G 1/096844; G08G 1/207; B60W 30/09; B60W 2710/18; B60W 2710/20; B60W 10/18; B60W 10/20; B60W 2420/52; B60W 2550/10; B60W 2710/08; B60W 2710/30; B60W 30/0956; B60W 30/18; B65G 1/1371; B65G 1/1378; G01C 21/00; G01C 21/005; G01C 21/26; G01C 21/34; G01C 25/00; G01S 17/023; G06K 9/00791; G06K 9/00805; G06N 7/005; G06N 99/005; G07C 5/0808; G07C 5/0841; G07C 5/0866
  USPC ................ 701/24, 25, 26, 50, 410; 700/216; 175/57; 171/1
  See application file for complete search history.

(56) References Cited

U.S. PATENT DOCUMENTS

| | | | |
|---|---|---|---|
| 7,110,881 B2 | 9/2006 | Gray et al. | |
| 8,116,977 B2 | 2/2012 | Aral et al. | |
| 9,226,449 B2 | 1/2016 | Bischoll | |
| 10,315,655 B2* | 6/2019 | Blank ................ | E02F 9/262 |
| 2004/0193348 A1* | 9/2004 | Gray ................ | A01B 69/008 |
| | | | 701/50 |
| 2004/0193349 A1* | 9/2004 | Flann ................ | A01B 69/008 |
| | | | 701/50 |
| 2005/0075784 A1* | 4/2005 | Gray ................ | A01B 69/008 |
| | | | 701/25 |
| 2005/0075785 A1* | 4/2005 | Gray ................ | A01B 69/008 |
| | | | 701/410 |
| 2012/0024605 A1* | 2/2012 | Elinas ................ | G06Q 10/06 |
| | | | 175/57 |
| 2012/0136524 A1* | 5/2012 | Everett ................ | E02F 9/2045 |
| | | | 701/24 |
| 2014/0277691 A1* | 9/2014 | Jacobus ................ | G06Q 10/087 |
| | | | 700/216 |
| 2015/0081156 A1* | 3/2015 | Trepagnier ............ | G01S 17/023 |
| | | | 701/26 |
| 2016/0050845 A1* | 2/2016 | Nilson ................ | A01D 17/10 |
| | | | 171/1 |
| 2016/0299507 A1* | 10/2016 | Shah ................ | G05D 1/0206 |
| 2017/0120803 A1* | 5/2017 | Kentley ................ | B60Q 1/26 |
| 2017/0120904 A1* | 5/2017 | Kentley ................ | G01C 21/32 |
| 2017/0123419 A1* | 5/2017 | Levinson ............ | G05D 1/0027 |
| 2017/0123421 A1* | 5/2017 | Kentley ................ | G01C 21/26 |
| 2017/0124781 A1* | 5/2017 | Douillard ................ | B60Q 1/26 |
| 2017/0132334 A1* | 5/2017 | Levinson ............ | G06F 17/5009 |
| 2017/0132934 A1* | 5/2017 | Kentley ................ | G08G 1/202 |
| 2017/0192431 A1* | 7/2017 | Foster ................ | A01B 79/005 |
| 2017/0297568 A1* | 10/2017 | Kentley ................ | G06F 3/1454 |
| 2017/0300064 A1* | 10/2017 | Wolters ................ | G05D 1/0219 |
| 2017/0311534 A1* | 11/2017 | Rusciolelli ............ | A01B 79/005 |
| 2017/0316333 A1* | 11/2017 | Levinson ............ | G05D 1/0088 |
| 2017/0351261 A1* | 12/2017 | Levinson ................ | G01S 17/42 |
| 2017/0354079 A1* | 12/2017 | Foster ................ | A01B 69/008 |
| 2017/0357262 A1* | 12/2017 | Dix ................ | G01S 19/13 |
| 2017/0357267 A1* | 12/2017 | Foster ................ | A01B 79/005 |
| 2018/0016098 A1* | 1/2018 | Lert ................ | B65G 1/045 |
| 2018/0157265 A1* | 6/2018 | Kentley-Klay ........ | B60N 2/002 |
| 2018/0190046 A1* | 7/2018 | Levinson ................ | B60Q 1/26 |
| 2018/0196439 A1* | 7/2018 | Levinson ............ | G05D 1/0088 |
| 2018/0251126 A1* | 9/2018 | Linscott ................ | B60W 30/09 |
| 2018/0259976 A1* | 9/2018 | Williams ............ | G05D 1/0293 |
| 2018/0276595 A1* | 9/2018 | Gariepy ............... | G06Q 10/083 |
| 2018/0276604 A1* | 9/2018 | Gariepy ............... | G06Q 10/087 |
| 2018/0276606 A1* | 9/2018 | Stadie ................ | B65G 1/0464 |
| 2018/0281599 A1* | 10/2018 | Kentley-Klay ...... | G05D 1/0077 |

OTHER PUBLICATIONS

Zhou et al., "Agricultural Operations Planning in Fields with Multiple Obstacle Areas", Computers and Electronics in Agriculture, vol. 109, Nov. 2014, pp. 12-22. (Year: 2014).*

Bechar et al., "Agricultural Robots for Field Operations. Part 2: Operations and Systems", Biosystems Engineering, vol. 153, Feb. 2017, pp. 110-128. (Year: 2017).*

* cited by examiner

PLANNING SYSTEM FOR AN AUTONOMOUS WORK VEHICLE SYSTEM

BACKGROUND

The disclosure relates generally to a planning system for an autonomous work vehicle system.

Certain autonomous work vehicles are controlled based on a plan that is generated by the autonomous work vehicle and/or a base station, for example. The plan includes a list of tasks to be performed by the autonomous work vehicle. For example, if the autonomous work vehicle is performing agricultural operations (e.g., towing a seeder or planter, harvesting crops, etc.), the plan may include traversing multiple swaths through a field, thereby enabling the autonomous work vehicle to cover at least a portion of the field. The plan may be generated based on certain rules that control operation of the autonomous work vehicle. For example, the rules may include a rule to enter the field at a field entry point, a rule to exit the field at a field exit point, a rule to avoid obstacles, a rule to cover portions of the field in a certain order, a rule to follow certain paths to reduce compaction, and so forth. Unfortunately, a planning system that utilizes all of the rules to generate a plan may be considerably complex due to the large number of rules and the potential conflicts between rules. In addition, an autonomous work vehicle that executes a plan based on a large number of rules may cover the field in an inefficient and/or undesirable manner.

BRIEF DESCRIPTION

In one embodiment, a planning system for an autonomous work vehicle system includes a controller having a memory and a processor. The controller is configured to determine a plan for the autonomous work vehicle system by reducing a cost function, and to output one or more signals indicative of the plan and/or instructions to execute the plan. The plan includes a route of the autonomous work vehicle system through a field, and the cost function includes multiple costs associated with operation of the autonomous work vehicle system. In addition, the costs include an obstacle management cost associated with traversing an obstacle, a positioning cost associated with positioning a processing assembly in a processed region of the field, a direction cost associated with traversing the field in a less suitable direction, a product management cost associated with inefficient management of product storage, an outlet positioning cost associated with positioning a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, or a combination thereof.

In another embodiment, a planning system for multiple autonomous work vehicle systems includes a controller having a memory and a processor. The controller is configured to determine a plan for the autonomous work vehicle systems by reducing a cost function, and to output one or more signals indicative of the plan and/or instructions to execute the plan. The plan includes a route of each autonomous work vehicle system through a field, and the cost function includes multiple costs associated with operation of the autonomous work vehicle systems. In addition, the costs include an obstacle management cost associated with traversing an obstacle, a positioning cost associated with positioning a processing assembly in a processed region of the field, a direction cost associated with traversing the field in a less suitable direction, a product management cost associated with inefficient management of product storage, an outlet positioning cost associated with positioning a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, a passing cost associated with at least two autonomous work vehicle systems passing one another along adjacent swaths, an operation order cost associated with performing operations out of order, or a combination thereof.

In a further embodiment, one or more tangible, non-transitory, machine-readable media include instructions configured to cause a processor to determine a plan for an autonomous work vehicle system by reducing a cost function. The instructions are also configured to cause the processor to output one or more signals indicative of the plan and/or instructions to execute the plan. The plan includes a route of the autonomous work vehicle system through a field, and the cost function includes multiple costs associated with operation of the autonomous work vehicle system. In addition, the costs include an obstacle management cost associated with traversing an obstacle, a positioning cost associated with positioning a processing assembly in a processed region of the field, a direction cost associated with traversing the field in a less suitable direction, a product management cost associated with inefficient management of product storage, an outlet positioning cost associated with positioning a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, or a combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
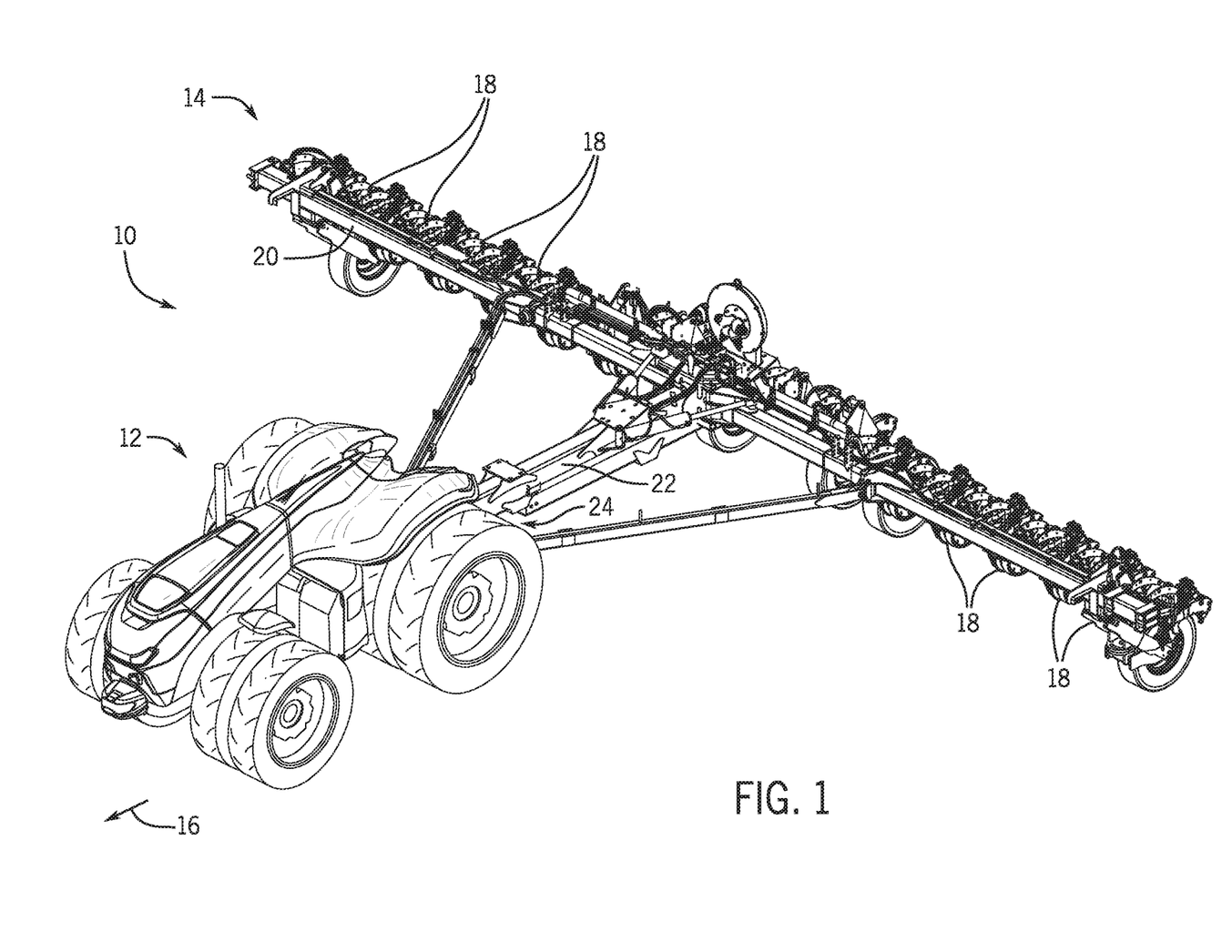
FIG. 1 is a perspective view of an embodiment of an autonomous work vehicle system including an autonomous work vehicle and an agricultural implement coupled to the autonomous work vehicle.

Turning now to the drawings, FIG. 1 is a perspective view of an embodiment of an autonomous work vehicle system 10 including an autonomous work vehicle 12 and an agricultural implement 14 coupled to the autonomous work vehicle 12. The autonomous work vehicle 12 includes a control system configured to automatically guide the autonomous work vehicle system 10 through a field (e.g., along a direction of travel 16) to facilitate agricultural operations (e.g., planting operations, seeding operations, application operations, tillage operations, harvesting operations, etc.). For example, the control system may automatically guide the autonomous work vehicle system 10 along multiple swaths through the field without input from an operator. The control system may also automatically guide the autonomous work vehicle system 10 around headland turns between swaths.

In the illustrated embodiment, the agricultural implement 14 is a planter having multiple row units 18 distributed along a tool bar 20. Each row unit is configured to open a trench into the soil and deposit agricultural product (e.g., seed, fertilizer, etc.) into the trench, thereby establishing rows of deposited agricultural product. Certain row units may include a closing assembly to direct displaced soil into the trench and/or a packer wheel to pack soil onto the deposited agricultural product. The number of row units 18 mounted on the tool bar 20 and/or a length of the tool bar 20 may be particularly selected (e.g., based on a target row spacing, a size of the agricultural field, etc.). In the illustrated embodiment, the agricultural implement 14 includes a tow bar 22 extending between the tool bar 20 and a hitch assembly 24. The hitch assembly 24 is configured to couple the agricultural implement to a corresponding hitch assembly of the autonomous work vehicle 12. While a planter is coupled to the autonomous work vehicle 12 in the illustrated embodiment, other agricultural implements may be coupled to the autonomous work vehicle in other embodiments. For example, in certain embodiments, a seeder, an air cart, a mower, a tillage tool, a sprayer, or a combination thereof, among other suitable agricultural implements, may be coupled to the autonomous work vehicle.

In certain embodiment, a planning system is configured to determine a plan for the autonomous work vehicle system 10 and, in certain embodiments, one or more other autonomous work vehicle systems performing agricultural operations within the field. The plan includes a route through the field for each autonomous work vehicle system, and each route may include multiple swaths (e.g., parallel swaths) and correspond paths between the swaths (e.g., headland turns). In certain embodiments, the path planning system includes a controller configured to determine a plan for the one or more autonomous work vehicle systems by reducing a cost function. The cost function includes multiple costs associated with operation of the one or more autonomous work vehicle systems. For example, the costs may include an obstacle management cost associated with traversing an obstacle, a positioning cost associated with positioning a processing assembly in a processed region of the field, a direction cost associated with traversing the field in a less suitable direction, a product management cost associated with inefficient management of product storage, an outlet positioning cost associated with position a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, or a combination thereof. In embodiments including multiple autonomous work vehicle systems, the costs may also include a passing cost associated with at least two autonomous work vehicle systems passing one another along adjacent swaths and/or an operation order cost associated with performing operations out of order. By utilizing a cost function to determine the plan, rules associated with controlling the one or more autonomous work vehicle systems (e.g., a rule to engage the processing assembly at a field entry point, a rule to disengage the processing assembly at a field exit point, a rule to avoid obstacles, a rule to cover portions of the field in a certain order, a rule to follow certain paths to reduce compaction, etc.) may be substantially reduced or eliminated, thereby reducing the duration and/or complexity of the path planning process and/or increasing the efficiency of the plan.

Figure 2:
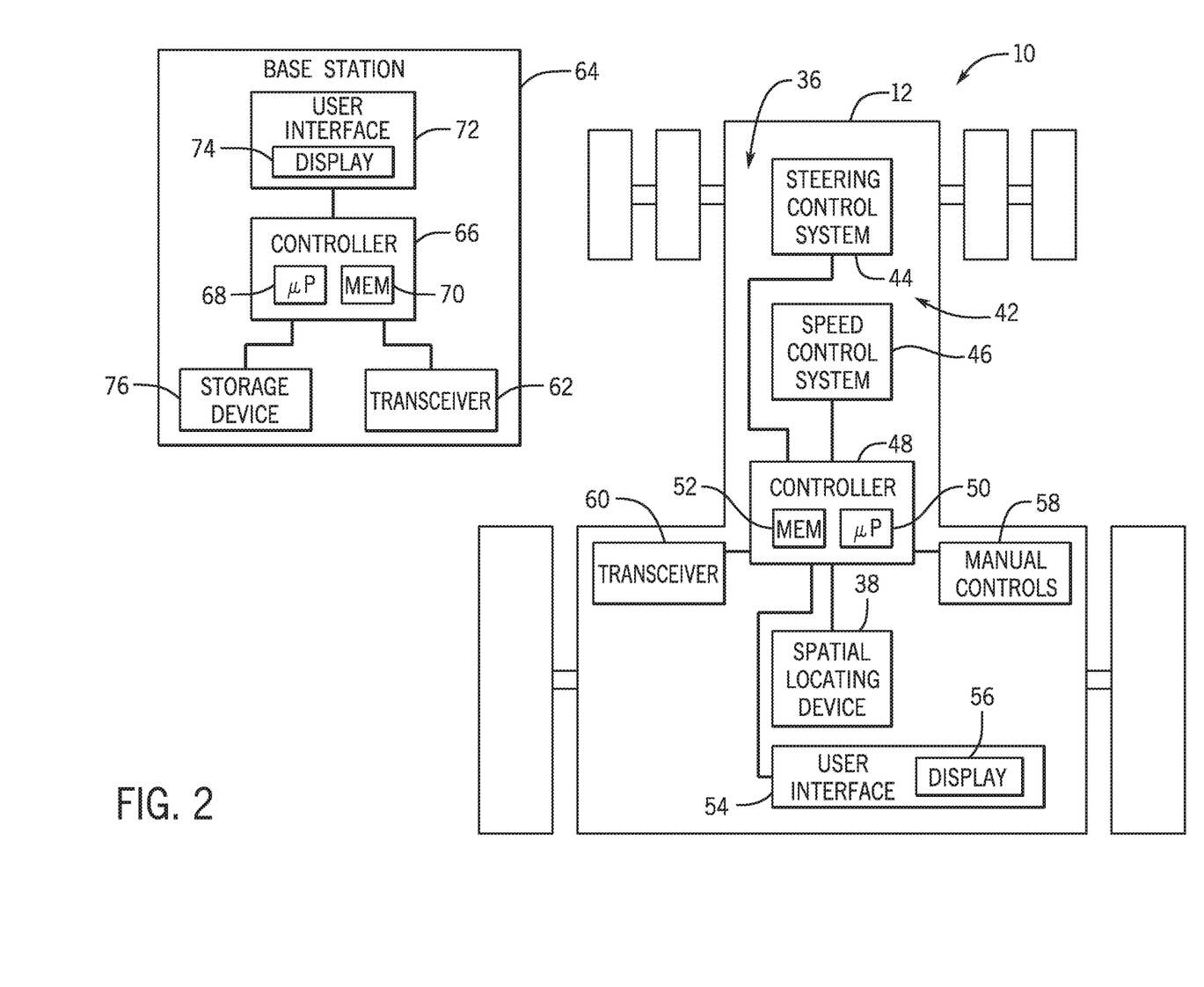
FIG. 2 is a block diagram of an embodiment of a control system that may be employed within the autonomous work vehicle system of FIG. 1.

FIG. 2 is a block diagram of an embodiment of a control system 36 (e.g., planning system) that may be employed within the autonomous work vehicle system 10 of FIG. 1. In the illustrated embodiment, the control system 36 includes a spatial locating device 38, which is mounted to the autonomous work vehicle 12 and configured to determine a position and, in certain embodiments, a velocity of the autonomous work vehicle 12. The spatial locating device 38 may include any suitable system configured to measure and/or determine the position of the autonomous work vehicle 12, such as a GPS receiver, for example.

In the illustrated embodiment, the control system 36 includes a movement control system 42 having a steering control system 44 configured to control a direction of movement of the autonomous work vehicle 12 and a speed control system 46 configured to control a speed of the autonomous work vehicle 12. In addition, the control system 36 includes a controller 48, which is communicatively coupled to the spatial locating device 38, to the steering control system 44, and to the speed control system 46. The controller 48 is configured to automatically control the autonomous work vehicle during certain phases of agricultural operations (e.g., without operator input, with limited operator input, etc.).

In certain embodiments, the controller 48 is an electronic controller having electrical circuitry configured to process data from the spatial locating device 38 and/or other components of the control system 36. In the illustrated embodiment, the controller 48 include a processor, such as the illustrated microprocessor 50, and a memory device 52. The controller 48 may also include one or more storage devices and/or other suitable components. The processor 50 may be used to execute software, such as software for controlling the autonomous work vehicle, software for determining a plan for the autonomous work vehicle system, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the autonomous work vehicle, instructions for determining a plan for the autonomous work vehicle system, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous work vehicle, etc.), and any other suitable data.

In certain embodiments, the steering control system 44 may include a wheel angle control system, a differential braking system, a torque vectoring system, or a combination thereof. The wheel angle control system may automatically rotate one or more wheels and/or tracks of the autonomous work vehicle (e.g., via hydraulic actuators) to steer the autonomous work vehicle along a target route (e.g., along a guidance swath, along headline turns, etc.). By way of example, the wheel angle control system may rotate front wheels/tracks, rear wheels/tracks, intermediate wheels/tracks, or a combination thereof, of the autonomous work vehicle (e.g., either individually or in groups). The differential braking system may independently vary the braking force on each lateral side of the autonomous work vehicle to direct the autonomous work vehicle along a path. In addition, the torque vectoring system may differentially apply torque from an engine to wheel(s) and/or track(s) on each lateral side of the autonomous work vehicle, thereby directing the autonomous work vehicle along a path. In further embodiments, the steering control system may include other and/or additional systems to facilitate directing the autonomous work vehicle along a path through the field.

In certain embodiments, the speed control system 46 may include an engine output control system, a transmission control system, a braking control system, or a combination thereof. The engine output control system may vary the output of the engine to control the speed of the autonomous work vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the autonomous work vehicle. Furthermore, the braking control system may adjust braking force, thereby controlling the speed of the autonomous work vehicle. In further embodiments, the speed control system may include other and/or additional systems to facilitate adjusting the speed of the autonomous work vehicle.

In certain embodiments, the control system may also control operation of the agricultural implement coupled to the autonomous work vehicle. For example, the control system may include an implement control system/implement controller configured to control a steering angle of the implement (e.g., via an implement steering control system having a wheel angle control system and/or a differential braking system) and/or a speed of the autonomous work vehicle system (e.g., via an implement speed control system having a braking control system). In such embodiments, the autonomous work vehicle control system may be communicatively coupled to a control system/controller on the implement via a communication network, such as a controller area network (CAN bus).

In the illustrated embodiment, the control system 36 includes a user interface 54 communicatively coupled to the controller 48. The user interface 54 is configured to enable an operator to control certain parameter(s) associated with operation of the autonomous work vehicle. For example, the user interface 54 may include a switch that enables the operator to selectively configure the autonomous work vehicle for autonomous or manual operation. In addition, the user interface 54 may include a battery cut-off switch, an engine ignition switch, a stop button, or a combination thereof, among other controls. In certain embodiments, the user interface 54 includes a display 56 configured to present information to the operator, such as a graphical representation of a guidance swath, a visual representation of certain parameter(s) associated with operation of the autonomous work vehicle (e.g., fuel level, oil pressure, water temperature, etc.), a visual representation of certain parameter(s) associated with operation of the agricultural implement coupled to the autonomous work vehicle (e.g., seed level, penetration depth of ground engaging tools, orientation(s)/position(s) of certain components of the implement, etc.), or a combination thereof, among other information. In certain embodiments, the display 56 may include a touch screen interface that enables the operator to control certain parameters associated with operation of the autonomous work vehicle and/or the agricultural implement.

In the illustrated embodiment, the control system 36 includes manual controls 58 configured to enable an operator to control the autonomous work vehicle while automatic control is disengaged (e.g., while unloading the autonomous work vehicle from a trailer, etc.). The manual controls 58 may include manual steering control, manual transmission control, manual braking control, or a combination thereof, among other controls. In the illustrated embodiment, the manual controls 58 are communicatively coupled to the controller 48. The controller 48 is configured to disengage automatic control of the autonomous work vehicle upon receiving a signal indicative of manual control of the autonomous work vehicle. Accordingly, if an operator controls the autonomous work vehicle manually, the automatic control terminates, thereby enabling the operator to control the autonomous work vehicle.

In the illustrated embodiment, the control system 36 includes a transceiver 60 communicatively coupled to the controller 48. The transceiver 60 is configured to establish a communication link with a corresponding transceiver 62 of a base station 64, thereby facilitating communication between the base station 64 and the control system 36 of the autonomous work vehicle 12. The transceiver 60 may operate at any suitable frequency range within the electromagnetic spectrum. For example, in certain embodiments, the transceiver 60 may broadcast and receive radio waves within a frequency range of about 1 GHz to about 10 GHz. In addition, the transceiver 60 may utilize any suitable communication protocol, such as a standard protocol (e.g., Wi-Fi, Bluetooth, etc.) or a proprietary protocol.

In the illustrated embodiment, the base station 64 includes a controller 66 communicatively coupled to the base station transceiver 62. The controller 66 is configured to output commands and/or data to the controller 48 of the autonomous work vehicle 12. For example, the controller 66 may be configured to determine a plan and to output one or more signals indicative of the plan to the autonomous work vehicle controller 48, thereby enabling the autonomous work vehicle controller to instruct the movement control system 42 to direct the autonomous work vehicle along a route of the plan.

In certain embodiments, the controller 66 is an electronic controller having electrical circuitry configured to process data from certain components of the base station 64 (e.g., the transceiver 62). In the illustrated embodiment, the controller 66 includes a processor, such as the illustrated microprocessor 68, and a memory device 70. The processor 68 may be used to execute software, such as software for determining a plan, and so forth. Moreover, the processor 68 may include multiple microprocessors, one or more "general-purpose" microprocessors, one or more special-purpose microprocessors, and/or one or more application specific integrated circuits (ASICS), or some combination thereof. For example, the processor 68 may include one or more reduced instruction set (RISC) processors. The memory device 70 may include a volatile memory, such as RAM, and/or a nonvolatile memory, such as ROM. The memory device 70 may store a variety of information and may be used for various purposes. For example, the memory device 70 may store processor-executable instructions (e.g., firmware or software) for the processor 68 to execute, such as instructions for determining a plan.

In the illustrated embodiment, the base station 64 includes a user interface 72 communicatively coupled to the controller 66. The user interface 72 is configured to present data from the autonomous work vehicle and/or the agricultural implement to an operator (e.g., data associated with operation of the autonomous work vehicle, data associated with operation of the agricultural implement, etc.). The user interface 72 is also configured to enable an operator to control certain functions of the autonomous work vehicle (e.g., starting and stopping the autonomous work vehicle, instructing the autonomous work vehicle to follow a route through the field, etc.). In the illustrated embodiment, the user interface includes a display 74 configured to present information to the operator, such as the position of the autonomous work vehicle system within the field, the speed of the speed of the autonomous work vehicle system, and the path of the autonomous work vehicle system, among other data.

In the illustrated embodiment, the base station 64 includes a storage device 76 communicatively coupled to the controller 66. The storage device 76 (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining a plan, etc.), and any other suitable data.

In certain embodiments, the control system may include other and/or additional controllers/control systems, such as the implement controller/control system discussed above. For example, the implement controller/control system may be configured to control various parameters of an agricultural implement towed by the autonomous work vehicle. In certain embodiments, the implement controller/control system may be configured to instruct actuator(s) to adjust a penetration depth of at least one ground engaging tool of the agricultural implement. By way of example, the implement controller/control system may instruct actuator(s) to reduce or increase the penetration depth of each tillage point on a tilling implement, or the implement controller/control system may instruct actuator(s) to engage or disengage each opener disc/blade of a seeding/planting implement from the soil. Furthermore, the implement controller/control system may instruct actuator(s) to transition the agricultural implement between a working position and a transport portion, to adjust a flow rate of product from the agricultural implement, or to adjust a position of a header of the agricultural implement (e.g., a harvester, etc.), among other operations. The autonomous work vehicle control system may also include controller(s)/control system(s) for electrohydraulic remote(s), power take-off shaft(s), adjustable hitch(es), or a combination thereof, among other controllers/control systems.

In certain embodiments, the controller 48 of the control system/planning system 36 is configured to determine a plan for the autonomous work vehicle system 10 by reducing a cost function. The plan includes a route through the field for the autonomous work vehicle system 10, and the route may include multiple swaths (e.g., parallel swaths) and correspond paths between the swaths (e.g., headland turns). The cost function includes multiple costs associated with operation of the autonomous work vehicle system. For example, the costs may include an obstacle management cost associated with traversing an obstacle, a positioning cost associated with positioning a processing assembly in a processed region of the field, a direction cost associated with traversing the field in a less suitable direction, a product management cost associated with inefficient management of product storage, an outlet positioning cost associated with position a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, or a combination thereof. By utilizing a cost function to determine the plan, rules associated with controlling the autonomous work vehicle system (e.g., a rule to engage the processing assembly at a field entry point, a rule to disengage the processing assembly at a field exit point, a rule to avoid obstacles, a rule to follow certain paths to reduce compaction, etc.) may be substantially reduced or eliminated, thereby reducing the duration and/or complexity of the path planning process and/or increasing the efficiency of the plan.

In certain embodiments, the autonomous work vehicle controller 48 determines the plan and outputs instructions to execute the plan (e.g., outputs instructions to the movement control system 42 to direct the work vehicle 12 along a route of the plan). However, in further embodiments, the plan may be determined and/or instructions to execute the plan may be output by one or more other controllers. For example, in certain embodiments, the planning system/control system 36 includes the base station controller 66. In such embodiments, the base station controller 66 may determine the plan and output one or more signals indicate of the plan to the work vehicle controller 48 (e.g., via the respective transceivers). The work vehicle controller 48 may then output one or more signals indicative of instructions to execute the plan (e.g., instructions to the movement control system 42 to direct the work vehicle 12 along a route of the plan). In further embodiments, the base station controller 66 may determine the plan and output one or more signals to the movement control system 42 and/or other components of the work vehicle system (e.g., via the respective transceivers, via the autonomous work vehicle controller, etc.) indicative of instructions to execute the plan (e.g., instructions to direct the work vehicle along a route of the plan, etc.). In embodiments in which the planning system/control system 36 includes the base station controller 66, the base station controller 66 may determine the plan for multiple autonomous work vehicle systems and output one or more signals indicative of the plan (e.g., including respective routes of the plan) or instructions to execute the plan to each autonomous work vehicle system (e.g., to the controller of each autonomous work vehicle system, to the movement control system of each autonomous work vehicle system, etc.).

Figure 3:
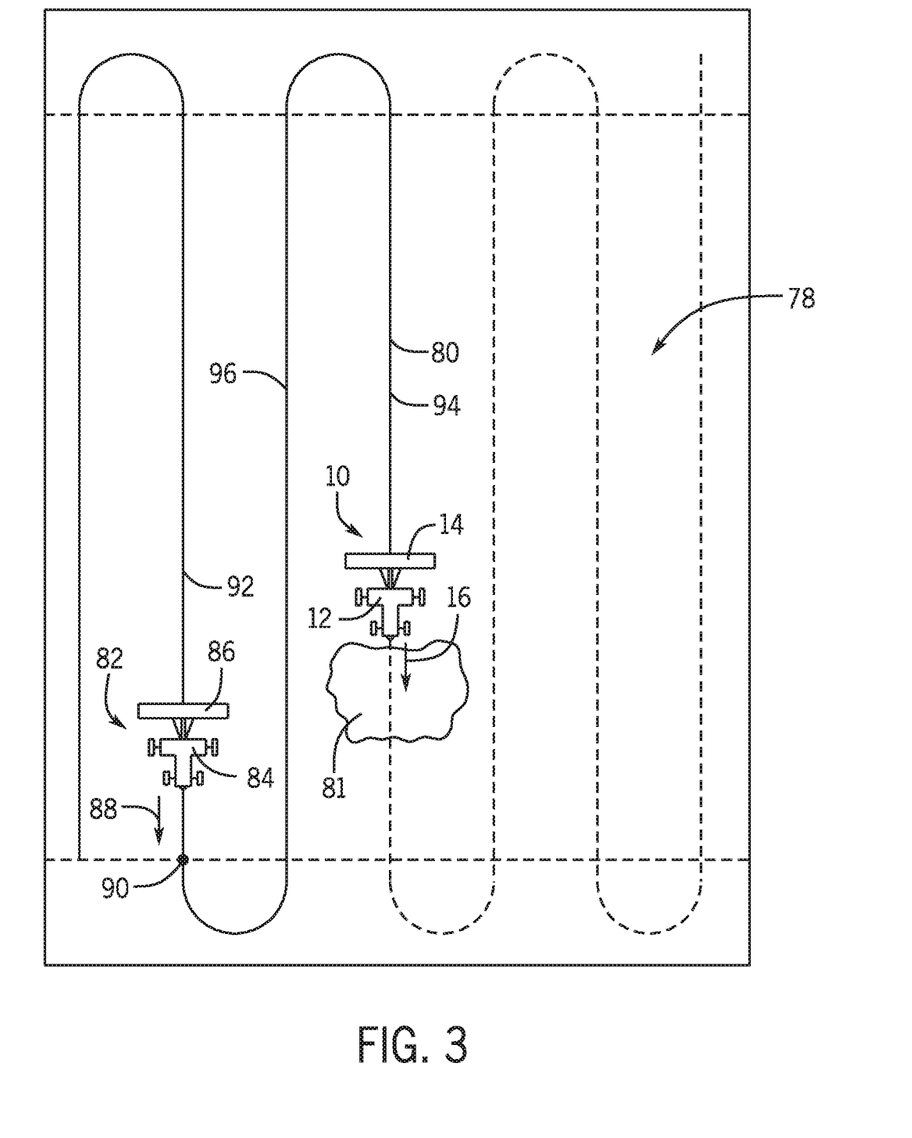
FIG. 3 is a schematic diagram of an embodiment of the autonomous work vehicle system within a field, in which the autonomous work vehicle system is approaching an obstacle.

FIG. 3 is a schematic diagram of an embodiment of the autonomous work vehicle system 10 within a field 78, in which the autonomous work vehicle system 10 is approaching an obstacle 81. As illustrated, the autonomous work vehicle system 10 is following a route 80 through the field 78. The solid lines represent a portion of the route 80 that has been traversed by the autonomous work vehicle system 10, and the dashed lines represent a portion of the route 80 that has been established but not traversed. The route 80 is an element of a plan that may also include routes for other autonomous work vehicles within the field. In certain embodiments, the base station controller is configured to determine the plan by reducing a cost function and to output one or more signals indicative of the plan (e.g., including a route of the plan) to the autonomous work vehicle controller, and the autonomous work vehicle controller is configured to output one or more signals indicative of instructions to execute the plan (e.g., instructions to direct the autonomous work vehicle 12 along the route 80 of the plan).

As previously discussed, the cost function includes multiple costs associated with operation of the autonomous work vehicle system 10. In certain embodiments, the costs include an obstacle management cost associated with traversing an obstacle, such as the illustrated obstacle 81. For example, the obstacle management cost may include a first obstacle management cost associated with traversing a route-blocking obstacle, and a second obstacle management cost associated with traversing an operation-interfering obstacle. Route-blocking obstacles may include obstacles to be avoided by the autonomous work vehicle system, such as a fence, a tree, or a building, among others. However, certain route-blocking obstacles may not interfere with movement of the implement through the field. For example, a hole in the field may block the route of the autonomous work vehicle, but the implement (e.g., sprayer, etc.) may traverse the hole. Operation-interfering obstacles may include obstacles that the autonomous work vehicle system may traverse, but may interfere with the agricultural operation, such as rough terrain or excessively wet soil, among others. Certain implements may be transitioned from a working/lowered position to a transport/raised position upon reaching an operation-interfering obstacle, thereby enabling the implement to traverse the operation-interfering obstacle. However, the implement may not be able to perform the agricultural operation while in the transport/raised position.

The first obstacle management cost associated with traversing a route-blocking obstacle may be significantly greater than the second obstacle management cost associated with traversing an operation-interfering obstacle. For example, a candidate plan that causes the autonomous work vehicle system to engage a route-blocking obstacle is highly undesirable. Accordingly, the first obstacle management cost is very high, such that the cost function of a plan (e.g., including a route) that causes the autonomous work vehicle system to engage a route-blocking obstacle is very high. Furthermore, traversing an operation-interfering obstacle may reduce the efficiency of the agricultural operation (e.g., due to a reduction in speed of the agricultural system, due to not performing the agricultural operation on a portion of the field because the implement is in the transport/raised position, etc.). However, traversing the operation-interfering obstacle may establish a more efficient route than avoiding the operation-interfering obstacle (e.g., due to the increased fuel usage associated with selecting a candidate plan that causes the autonomous work vehicle system to avoid the operation-interfering obstacle, due to the presence of a route-blocking obstacle along the route of a candidate plan that causes the autonomous work vehicle system to avoid the operation-interfering obstacle, etc.). Accordingly, the second obstacle management cost associated with traversing the operation-interfering obstacle may be less than the first obstacle management cost.

In certain embodiments, the controller of the planning system is configured to determine a plan for the autonomous work vehicle system by reducing a cost function. As previously discussed, the plan includes the route 80 of the autonomous work vehicle system 10 through the field 78. The cost function represents the total cost associated with a plan. For example, the obstacle management cost (e.g., including the first obstacle management cost and the second obstacle management cost) may be added to other costs (e.g., positioning cost, direction cost, initiation time cost, etc.) of the cost function. In certain embodiments, certain costs may be multiplied by a weighting factor before being added to the total (e.g., based on a priority of the event/condition associated with the cost). In certain embodiments, the controller is configured to determine a set of candidate plans (e.g., including respective routes through the field), to determine the cost function associated with each plan, and to select a plan that has the lowest cost function of the set (e.g., reducing a cost function). The candidate plans may be determined by any suitable technique (e.g., a technique that determines a subsequent candidate plan based on the cost function of the previous candidate plan, etc.).

By way of example, due to the very high first obstacle management cost, a candidate plan that causes the autonomous work vehicle system to engage a route-blocking obstacle is generally not selected. However, a candidate plan that causes the autonomous work vehicle system to engage an operation-interfering obstacle may be selected if the candidate plans that cause the autonomous work vehicle system to avoid the operation-interfering obstacle have a higher cost function. Furthermore, if a route-blocking obstacle does not interfere with movement of the implement through the field, and a candidate plan causes the implement to overlap the route-blocking obstacle without causing the autonomous work vehicle to engage the route-blocking obstacle, the first obstacle management cost associated with traversing the route-blocking obstacle may be zero because the route-blocking obstacle does not interfere with movement of the autonomous work vehicle system.

In the illustrated embodiment, a second autonomous work vehicle system 82 is operating within the field 78. As illustrated, the second autonomous work vehicle system 82 includes a second work vehicle 84 and a second implement 86. The second work vehicle 84 is configured to move the second implement 86 along a direction of travel 88 to enable the second implement to perform an agricultural operation within the field. For example, the first autonomous work vehicle system 10 may be configured to perform a tilling operation, and the second autonomous work vehicle system 82 may be configured to perform a planting or seeding operation. Accordingly, the second autonomous work vehicle system may generally follow the same route as the first autonomous work vehicle system through the field. As illustrated, the second autonomous work vehicle system 82 is approaching an end point 90 of a swath 92 through the field 78.

In certain embodiments, the costs also include a product management cost associated with inefficient management of product storage. For example, the product management cost may include a first product management cost associated with depleting a supply of product for application to the field and/or a second product management cost associated with reaching a capacity of a storage compartment. For example, in certain embodiments, the second implement 86 of the second autonomous work vehicle system 82 is configured to deposit agricultural product (e.g., seed, fertilizer, etc.) into soil of the field 78. However, if the supply of agricultural product is depleted while the second autonomous work vehicle system 82 is at the illustrated location, a portion of the swath 92 may not receive the agricultural product. Accordingly, if a candidate plan causes an autonomous work vehicle system to deplete the supply of product before reaching the end of a swath, the first product management cost may be added to the cost function. As such, a candidate plan that causes an autonomous work vehicle system to deplete the supply of product before reaching the end of a swath may have a higher cost function than a candidate plan that causes the autonomous work vehicle system to complete the swath before the product is depleted.

When depletion of product is expected before the end of a subsequent swath, the plan may cause the autonomous work vehicle system to move from the end point of a completed swath to a location (e.g., within a headland, remote from the field, etc.) where additional product may be added to the autonomous work vehicle system. Once the product compartment/tank is refilled, the plan may then cause the autonomous work vehicle system to move to a starting point of the subsequent swath before reinitiating the agricultural operation. Accordingly, if the autonomous work vehicle system completes a swath without depleting the supply of product before moving toward the refill location, no first product management cost may be added to the cost function (e.g., the first product management cost may be zero). As such, a candidate plan that causes the second autonomous work vehicle system to complete the swath before the product is depleted may have a lower cost function than a candidate plan that causes the second autonomous work vehicle system to deplete the supply of product before reaching the end of the swath.

In further embodiments, the second implement of the second autonomous work vehicle system may be configured to collect agricultural product (e.g., wheat, cotton, etc.) from the field. However, if a storage compartment configured to store the collected agricultural product reaches capacity before the second autonomous work vehicle system reaches the end of the swath, agricultural product may not be collected from a portion of the field. Accordingly, if the plan causes the storage compartment of the second autonomous work vehicle system to reach capacity before the end of a swath, the second product management cost may be added to the cost function. As such, a candidate plan that causes the storage compartment of the second autonomous work vehicle system to reach capacity before the end of a swath may have a higher cost function than a candidate plan that causes the second autonomous work vehicle system to complete the swath before the storage compartment reaches capacity.

When reaching the capacity of the storage compartment is expected before the end of a subsequent swath, the plan may cause the autonomous work vehicle system to move from the end point of a completed swath to a location (e.g., within a headland, remote from the field, etc.) where agricultural product may be transferred from the autonomous work vehicle system to a storage container (e.g., coupled to an on-road truck, etc.). Once the storage compartment is substantially empty, the plan may then cause the autonomous work vehicle system to move to a starting point of the subsequent swath before reinitiating the agricultural operation. Accordingly, if the autonomous work vehicle system completes a swath without reaching the capacity of the storage compartment before moving toward the unloading location, no second product management cost may be added to the cost function (e.g., the second product management cost may be zero). As such, a candidate plan that causes the second autonomous work vehicle system to complete the swath before the storage compartment reaches capacity may have a lower cost function than a candidate plan that causes the storage compartment of the second autonomous work vehicle system to reach capacity before reaching the end of the swath.

In certain embodiments, the controller of the planning system is configured to determine individual plans for each of the autonomous work vehicle systems. For example, the controller may determine a first plan for the first autonomous work vehicle system by reducing a respective cost function for the first plan, and the controller may determine a second plan for the second autonomous work vehicle system by reducing a respective cost function for the second plan. However, in further embodiments, the controller of the planning system may determine a single plan for multiple autonomous work vehicle systems by reducing a cost function that includes costs for each of the autonomous work vehicle systems. While two autonomous work vehicle systems are included in the illustrated embodiment, in other embodiments, one or more plans may be determined for more or fewer autonomous work vehicle systems.

In certain embodiments (e.g., embodiments in which a single plan is determined for multiple autonomous work vehicle systems), the costs may include a passing cost associated with at least two autonomous work vehicle systems passing one another along adjacent swaths. As illustrated, the first autonomous work vehicle system 10 is traversing a first swath 94 within the field 78, the second autonomous work vehicle system 82 is traversing a second swath 92 within the field 78, and the first and second swaths are separated from one another by an intermediate swath 96. Because the first and second autonomous work vehicle systems are separated from one another by the intermediate swath 96, the autonomous work vehicle systems are not passing one another along adjacent swaths. Therefore, no passing cost may be added to the cost function (e.g., the passing cost may be zero). Indeed, a candidate plan that causes one autonomous work vehicle system to pass the other autonomous work vehicle system along adjacent swaths (e.g., due to the speed difference between the autonomous work vehicle systems) is generally avoided. Accordingly, the passing cost is very high, such that the cost function of a candidate plan that causes the autonomous work vehicle systems to pass one another along adjacent swaths is very high. In embodiments in which at least two autonomous work vehicle systems are traversing the field along adjacent swaths in the same direction of travel, the plan may cause the speed of one autonomous work vehicle system to be different than the speed of the other autonomous work vehicle system, such that no passing occurs.

In certain embodiments, the costs include an order of operation cost associated with performing operations out of order. For example, the first autonomous work vehicle system 10 may be configured to perform a first operation (e.g., a tillage operation), and the second autonomous work vehicle system 82 may be configured to perform a second operation (e.g., a seeding or planting operation), which is different than the first operation. The first operation (e.g., the tillage operation) is configured to be performed before the second operation (e.g., the seeding or planting operation). Accordingly, the order of operation cost is associated with performing the second operation (e.g., the seeding or planting operation) before the first operation (e.g., the tillage operation). Because the first autonomous work vehicle system 10 is configured to perform the first operation (e.g., along a swath) before the second autonomous work vehicle system performs the second operation (e.g., along the same swath), no order of operation cost may be added to the cost function (e.g., the order of operation cost may be zero). However, if a candidate plan causes the second operation to be performed before the first operation (e.g., on one swath within the field), the order of operation cost may be added to the cost function, thereby increasing the cost function for such a candidate plan. In certain embodiments, after the second operation is performed on a swath, the plan may cause the implement of the autonomous work vehicle system configured to perform the first operation (e.g., the first autonomous work vehicle system) to transition to the transport/raised position before traversing the swath. No order of operation cost, or a lower order of operation cost, may be added to the cost function for such a plan because the implement does not engage the swath.

Figure 4:
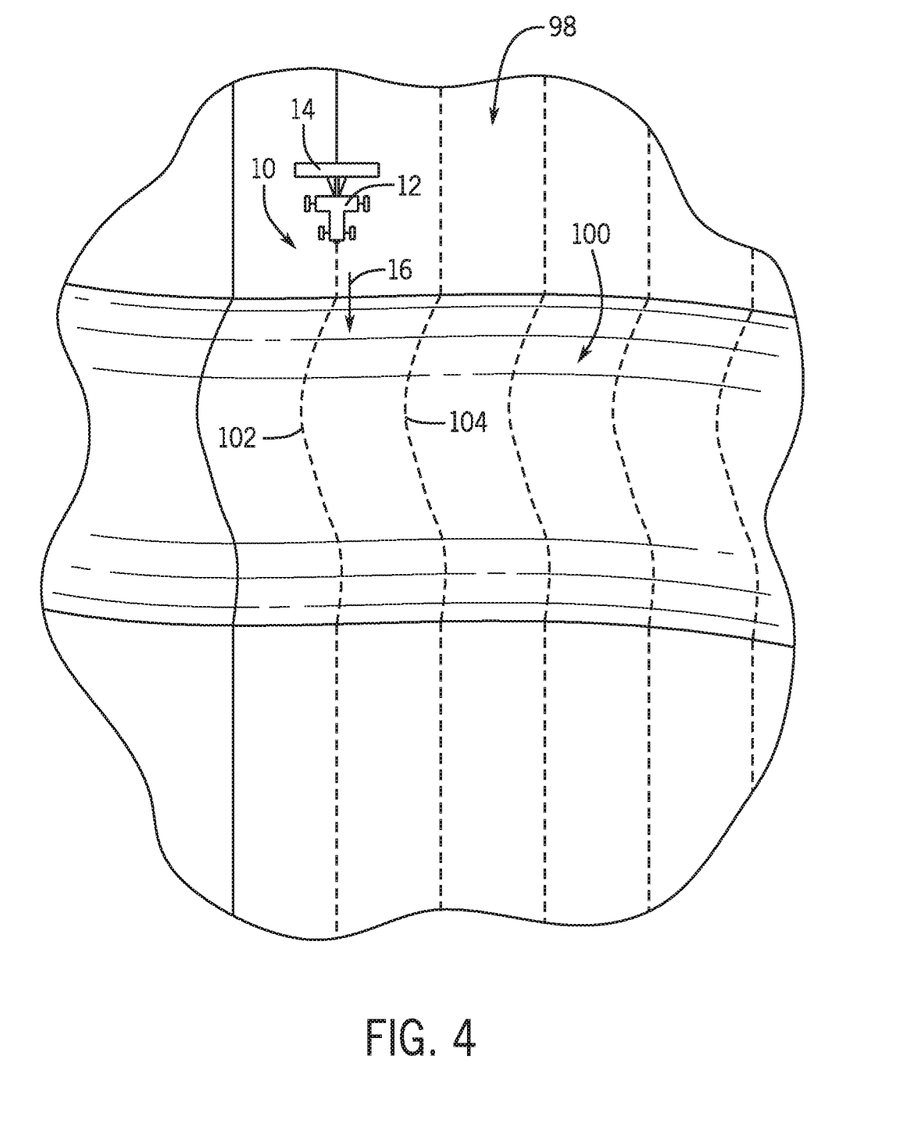
FIG. 4 is a schematic diagram of an embodiment of the autonomous work vehicle system within a field, in which the autonomous work vehicle system is approaching a hill.

FIG. 4 is a schematic diagram of an embodiment of the autonomous work vehicle system 10 within a field 98, in which the autonomous work vehicle system 10 is approaching a hill 100. As illustrated, the autonomous work vehicle system 10 is moving in the direction of travel 16 along a swath 102 of a route 104. Certain implements (e.g., harvesting implements) include a processing assembly configured to follow terrain along certain contours. For example, the implement 14 may include a processing assembly configured to traverse the hill 100 along an increasing/decreasing height path, as illustrated. However, in alternative embodiments, the processing assembly of the implement may be configured to traverse the hill perpendicularly to the increasing/decreasing height path (e.g., along sloped sides of the hill). Accordingly, in certain embodiments, the costs include a direction cost associated with traversing the field in a less suitable direction. The direction cost may include a first direction cost associated with traversing terrain in the less suitable direction for the processing assembly, and/or a second direction cost associated with harvesting crops in the less suitable direction relative to a crop leaning direction, as discussed in detail below. Because the autonomous work vehicle system 10 is configured to traverse the terrain (e.g., hill) in a suitable direction for the processing assembly of the implement, no direction cost may be added to the cost function (e.g., the direction cost may be zero). However, if a candidate plan causes the processing system of the implement to traverse the terrain (e.g., hill) in the less suitable direction, the direction cost may be added to the cost function, thereby increasing the cost function for such a candidate plan.

Figure 5:
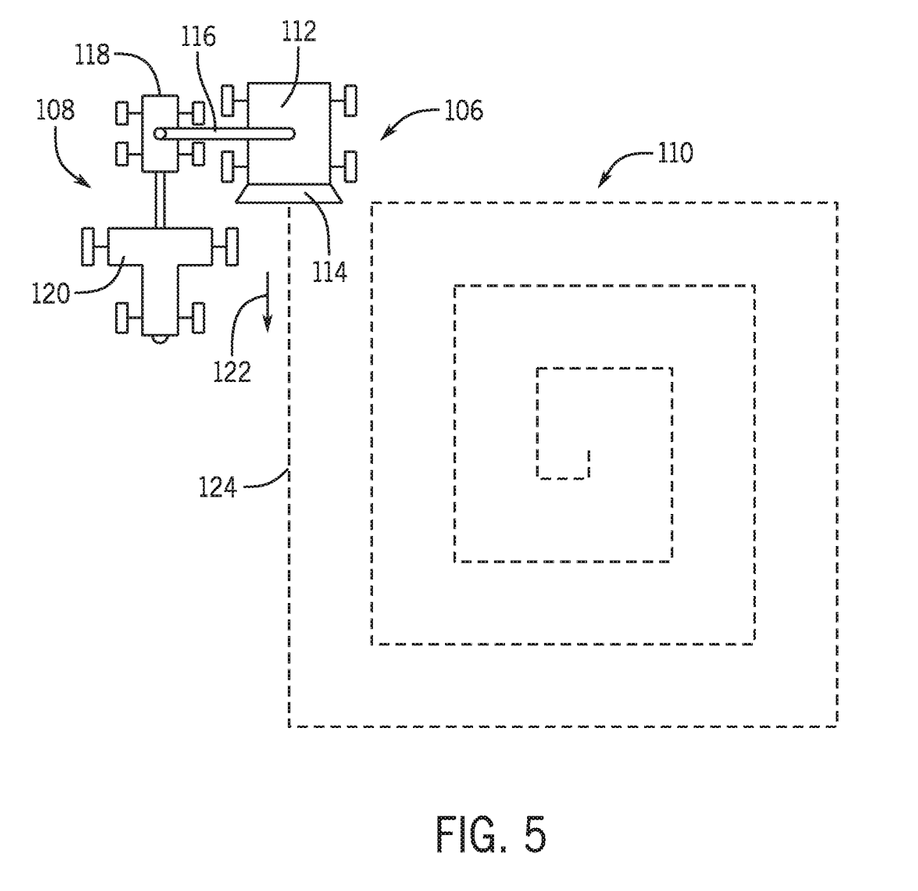
FIG. 5. is a schematic diagram of another embodiment of an autonomous work vehicle system and a haul vehicle system within a field.

FIG. 5. is a schematic diagram of another embodiment of an autonomous work vehicle system 106 and a haul vehicle system 108 within a field 110. In the illustrated embodiment, the autonomous work vehicle system 106 includes a harvester 112 having a header 114 (e.g., processing assembly) and a conveyor 116. The header 114 is configured to harvest crops from the field 110, and the conveyor 116 is configured to convey the harvested crops to a storage compartment 118 of the haul vehicle system 108. A work vehicle 120 of the haul vehicle system 108 is configured to move the storage compartment 118 through the field 110, such that the storage compartment 118 maintains alignment with an outlet of the conveyor 116. In certain embodiments, the work vehicle 120 may be an autonomous work vehicle, and the plan may include a route for the autonomous work vehicle.

As previously discussed, in certain embodiments, the costs include a second direction cost associated with harvesting crops in the less suitable direction relative to the crop lean direction. For example, the autonomous work vehicle system 106 moves in a direction of travel 122 along a route 124 through the field. If the crops within the field 110 lean toward the autonomous work vehicle system 106 opposite the direction of travel 122, the header 114 may harvest the crops efficiently. Accordingly, no second direction cost may be added to the cost function (e.g., the second direction cost may be zero). However, if the crops within the field 110 lean away from the autonomous work vehicle system 106 along the direction of travel 122, the header 114 may not harvest the crops as efficiently. Accordingly, a second direction cost may be added to the cost function, thereby increasing the cost function for the plan having the illustrated route 124. In certain embodiments, the value of the second direction cost may vary based on the angle of the crop leaning direction relative to the direction of travel of the autonomous work vehicle system.

In certain embodiments, the costs also include a positioning cost associated with positioning the header 114 (e.g., processing assembly) in a processed region of the field 110. For example, following a route through a processed region of the field may increase the length of the route (e.g., as compared to a route that extends through the unprocessed region of the field), thereby reducing the efficiency of the agricultural operation. In the illustrated embodiment, the plan causes the autonomous work vehicle system 106 to follow the route 124 through an unprocessed region of the field 110 (e.g., a region of the field in which crops have not been harvested). Accordingly, no positioning cost may be added to the cost function (e.g., the positioning cost may be zero). However, if a candidate plan causes the autonomous work vehicle system to follow a route through a processed region of the field 110, a positioning cost may be added to the cost function, thereby increasing the cost function for a candidate plan having such a route. In certain embodiments, the value of the positioning cost may vary based on the length of the route through the processed region of the field.

In certain embodiments, the costs include an outlet positioning cost associated with positioning a product outlet (e.g., the outlet of the conveyor 116) over the unprocessed region of the field 110. Positioning the haul vehicle system 106 within the processed region of the field 110 substantially reduces or eliminates engagement of the haul vehicle system 106 with unprocessed (e.g., unharvested) crops. As a result, the quality and/or quantity of the agricultural product output from the autonomous work vehicle system 106 may be enhanced. While the haul vehicle system 106 is positioned within the processed region of the field, the outlet of the conveyor 116 is positioned over the processed region to provide product to the storage compartment 118. Accordingly, no outlet positioning cost may be added to the cost function (e.g., the outlet positioning cost may be zero). However, if a candidate plan causes the product outlet (e.g., the outlet of the conveyor 116) to be positioned over the unprocessed region of the field 110 (e.g., because the haul vehicle system is positioned within the unprocessed region of the field), an outlet positioning cost may be added to the cost function, thereby increasing the cost function for such a candidate plan. In certain embodiments, the value of the outlet positioning cost may vary based on the length of the path of the product outlet over the unprocessed region of the field. Furthermore, in certain embodiments, if the product outlet is not outputting product while the product outlet is positioned over the unprocessed region of the field (e.g., because the haul vehicle system is not positioned within the unprocessed region of the field), no outlet positioning cost may be added to the cost function (e.g., the outlet positioning cost may be zero).

In certain embodiments, the outlet positioning cost includes a turning cost associated with turning the autonomous work vehicle system in a direction that positions the product outlet over the unprocessed region of the field. For example, in the illustrated embodiment, making left turns positions the product outlet (e.g., the outlet of the conveyor) over the processed region of the field. Accordingly, no outlet positioning cost may be added to the cost function (e.g., the outlet positioning cost may be zero) if the route includes only left turns. However, if a candidate plan includes a right turn (e.g., causing the outlet to be positioned over the unprocessed region of the field), an outlet positioning cost may be added to the cost function, thereby increasing the cost function for such a candidate plan. In certain embodiments, the value of the outlet positioning cost may vary based on the number of turns in a direction that positions the product outlet over the unprocessed region of the field.

In certain embodiments, the costs include a compaction cost associated with not traversing a compaction lane. Compaction lanes may correspond to paths through the field that are traversed by multiple vehicles for multiple agricultural operations (e.g., tillage operations, planting operations, harvesting operations, etc.). The compaction lanes substantially reduce or eliminate compaction within other areas of the field, thereby facilitating crop development within those areas. Accordingly, if a candidate plan causes the autonomous work vehicle system to traverse a compaction lane, no compaction cost may be added to the cost function (e.g., the compaction cost may be zero). However, if a candidate plan causes the autonomous work vehicle system to traverse an area of the field outside of the compaction lane, a compaction cost may be added to the cost function, thereby increasing the cost function for such a candidate plan. In certain embodiments, the value of the compaction cost may vary based on the length of the path traversed by the autonomous work vehicle system outside of the compaction lane.

Figure 6:
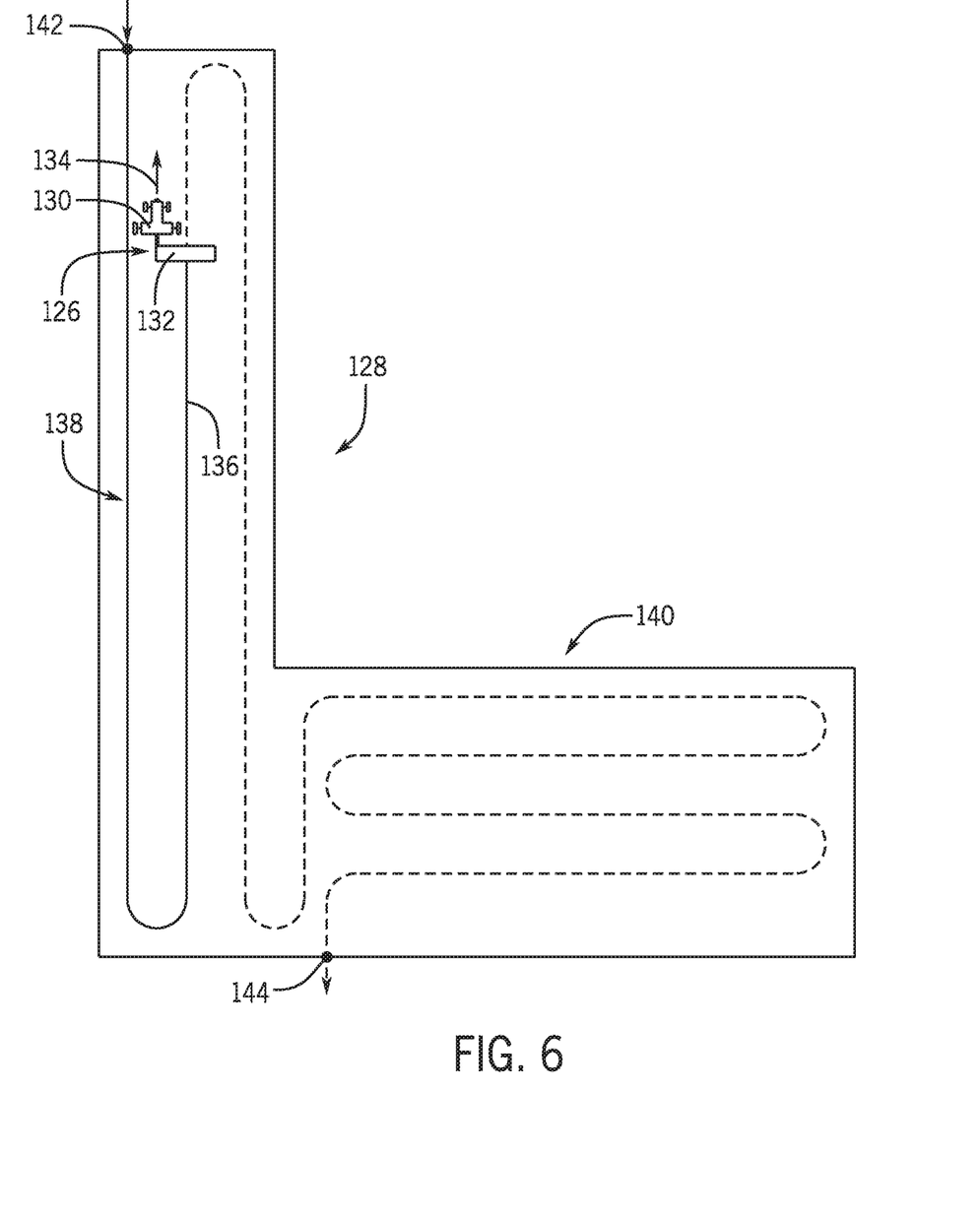
FIG. 6 is a schematic diagram of a further embodiment of an autonomous work vehicle system within a field having multiple partitions.

FIG. 6 is a schematic diagram of a further embodiment of an autonomous work vehicle system 126 within a field 128 having multiple partitions. As illustrated, the autonomous work vehicle system 126 includes an autonomous work vehicle 130 and an implement 134 (e.g., including a processing assembly). In the illustrated embodiment, a centerline of the implement 132 is offset from a centerline of the autonomous work vehicle 130. Accordingly, while the autonomous work vehicle 130 moves along a direction of travel 134, the implement 132 moves along a route 136 through the field. For example, the implement 132 may include a mower assembly, thereby enabling the autonomous work vehicle system 126 to mow the field 128 as the implement 132 moves along the route 136.

As previously discussed, the costs may include a positioning cost associated with positioning the processing assembly (e.g., mower) of the implement in a processed (e.g., mowed) region of the field 128. For example, following a route through a processed region of the field may increase the length of the route (e.g., as compared to a route that extends through the unprocessed region of the field), thereby reducing the efficiency of the agricultural operation. In the illustrated embodiment, the plan causes the implement 132 to follow the route 136 through an unprocessed portion of the field 128 (e.g., a portion of the field that has not been mowed). Accordingly, no positioning cost may be added to the cost function (e.g., the positioning cost may be zero). However, if a candidate plan causes the implement to follow a route through a processed region of the field 128, a positioning cost may be added to the cost function, thereby increasing the cost function for a candidate plan having such a route. In certain embodiments, the value of the positioning cost may vary based on the length of the route through the processed region of the field.

Furthermore, the costs may include an autonomous work vehicle positioning cost associated with positioning the autonomous work vehicle in an unprocessed (e.g., not mowed) region of the field 128. In the illustrated embodiment, the plan causes the autonomous work vehicle 130 to move through a processed portion of the field 128 (e.g., a portion of the field that has been mowed). Accordingly, no autonomous work vehicle positioning cost may be added to the cost function (e.g., the autonomous work vehicle positioning cost may be zero). However, if a candidate plan causes the autonomous work vehicle to move through an unprocessed region of the field 128, an autonomous work vehicle positioning cost may be added to the cost function, thereby increasing the cost function for such a candidate plan. In certain embodiments, the value of the autonomous work vehicle positioning cost may vary based on the length of the path through the unprocessed region of the field.

In the illustrated embodiment, the field 128 includes a first partition 138 and a second partition 140. Partitions represent portions of the field that may be ordered by the plan. For example, the planning system may determine that performing the agricultural operation on the first partition before performing the agricultural operation on the second partition may be more efficient than performing the agricultural operation on the partitions in the reverse order. For example, the planning system (e.g., the controller of the planning system) may determine the partition order based at least in part on the geometry of the field.

In certain embodiments, the costs include a partition order cost associated with not following the determined partition order. As illustrated, the path includes a route 136 that causes the autonomous work vehicle system 126 to traverse the first partition 138 before the second partition 140. Accordingly, no partition order cost may be added to the cost function (e.g., the partition order cost may be zero). However, if a candidate plan causes the autonomous work vehicle system to traverse the second partition before the first partition, a partition order cost may be added to the cost function, thereby increasing the cost function for such a candidate plan.

Furthermore, certain fields may include a first partition corresponding to a headland of the field and a second partition corresponding to a region of the field covered by swaths. For certain agricultural operations (e.g., harvesting operations), the planning system may determine that performing the agricultural operation on the first partition before performing the agricultural operation on the second partition is more efficient. However, for other agricultural operations (e.g., tillage operations), the planning system may determine that performing the agricultural operation on the second partition before performing the agricultural operation on the first partition is more efficient. A partition cost may be added to the cost function if a candidate path causes the partitions to be traversed out of order.

In certain embodiments, the costs include an entry point cost associated with not engaging the processing assembly at a field entry point 142. Engaging the processing assembly (e.g., mower) at the field entry point 142 increases the efficiency of the agricultural operation by reducing the distance traveled between the field entry point and the position at which the agricultural operation is initiated. Accordingly, if a candidate plan causes the processing assembly to engage at the field entry point 142, no entry point cost may be added to the cost function (e.g., the entry point cost may be zero). However, if a candidate plan causes the processing assembly to engage at a location within the field 128 remote from the entry point 142, an entry point cost may be added to the cost function, thereby increasing the cost function for such a candidate plan. In certain embodiments, the value of the entry point cost may vary based on the length of the path between the entry point and the location at which the processing assembly is engaged.

In certain embodiments, the costs include an exit point cost associated with not disengaging the processing assembly at a field exit point 144. Disengaging the processing assembly (e.g., mower) at the field exit point 144 increases the efficiency of the agricultural operation by reducing the distance traveled between the position at which the agricultural operation is terminated and the field exit point. Accordingly, if a candidate plan causes the processing assembly to disengage at the field exit point 144, no exit point cost may be added to the cost function (e.g., the exit point cost may be zero). However, if a candidate plan causes the processing assembly to disengage at a location within the field 128 remote from the exit point 144, an exit point cost may be added to the cost function, thereby increasing the cost function for such a candidate plan. In certain embodiments, the value of the exit point cost may vary based on the length of the path between the location at which the processing assembly is disengaged and the exit point 144.

In certain embodiments, the costs include an initiation time cost associated with not initiating the plan at a target time. In certain embodiments, the controller of the planning system is configured to determine the target time based on weather conditions at the field. For example, harvesting certain crops in dry conditions (e.g., while not raining) may enhance certain qualities and/or the value of the crops. Accordingly, the target time may be selected based on the current weather conditions and/or a forecast of the weather conditions. If a plan is initiated at the target time, no initiation time cost may be added to the cost function (e.g., the initiation time cost may be zero). However, if a plan is initiated earlier or later than the target time, an initiation time cost may be added to the cost function, thereby increasing the cost function for such a plan. In certain embodiments, the value of the initiation time cost may vary based on the duration between the initiation time and the target time. In certain embodiments, the target time may be based on other factors (e.g., in addition to or instead of weather conditions), such as availability of equipment and/or condition of the crops, among other factors.

As previously discussed, the controller of the planning system is configured to determine a plan for the autonomous work vehicle system by reducing a cost function. The cost function represents the total cost associated with a plan. For example, the obstacle management cost, the positioning cost, the direction cost, the product management cost, the outlet positioning cost, the compaction cost, the partition order cost, the entry point cost, the exit point cost, the initiation time cost, or a combination thereof, may be added to one other. In certain embodiments, the controller is configured to determine a set of candidate plans (e.g., including respective routes through the field), to determine the cost function associated with each plan, and to select a plan that has the lowest cost function of the set (e.g., reducing a cost function). The candidate plans may be determined by any suitable technique (e.g., a technique that determines a subsequent candidate plan based on the cost function of the previous candidate plan, etc.).

In certain embodiments, the controller of the planning system is configured to determine individual plans for each of the autonomous work vehicle systems. For example, the controller may determine a first plan for a first autonomous work vehicle system by reducing a respective cost function for the first plan, and the controller may determine a second plan for a second autonomous work vehicle system by reducing a respective cost function for the second plan. However, in further embodiments, the controller of the planning system may determine a single plan for multiple autonomous work vehicle systems by reducing a cost function that includes costs for each of the autonomous work vehicle systems.

While multiple costs of the cost function are described above, in certain embodiments, the cost function may include additional and/or alternative costs. For example, the cost function may include a length cost associated with the length of the route (e.g., a longer route may have a higher cost than a shorter route). Furthermore, the cost function may include a fuel usage cost associated with the fuel consumed while executing the plan (e.g., a higher fuel usage may have a higher cost than a lower fuel usage). The cost function may also include a time cost associated with the duration of the plan (e.g., a longer duration may have a higher cost than a shorter duration). Furthermore, in certain embodiments, the cost function may include any combination of the costs disclosed herein, any of the costs disclosed herein may be omitted from the cost function, and the cost function may include additional and/or alternative costs to the costs disclosed herein. In addition, while agricultural operations are disclosed above, it should be appreciated that the planning system and method disclosed herein may be utilized for other autonomous work vehicle operations, such as construction operations.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A planning system for an autonomous work vehicle system, comprising:
   a controller comprising a memory and a processor, wherein the controller is configured to determine a plan for the autonomous work vehicle system by reducing a cost function, and to output one or more signals indicative of the plan, instructions to execute the plan, or a combination thereof;

wherein the plan includes a route of the autonomous work vehicle system through a field, and the cost function includes a plurality of costs associated with operation of the autonomous work vehicle system; and wherein the plurality of costs comprises a positioning cost associated with positioning a processing assembly in a processed region of the field, a product management cost associated with inefficient management of product storage, an outlet positioning cost associated with positioning a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, or a combination thereof.

2. The planning system of claim 1, wherein the plurality of costs comprises an obstacle management cost associated with traversing an obstacle, and wherein the obstacle management cost comprises a first obstacle management cost associated with traversing a route-blocking obstacle, a second obstacle management cost associated with traversing an operation-interfering obstacle, or a combination thereof.

3. The planning system of claim 1, wherein the processing assembly is towed by an autonomous work vehicle of the autonomous work vehicle system.

4. The planning system of claim 1, wherein the product management cost comprises a first product management cost associated with depleting a supply of product for application to the field, a second product management cost associated with reaching a capacity of a storage compartment, or a combination thereof.

5. The planning system of claim 1, wherein the plurality of costs comprises a direction cost associated with traversing the field in a less suitable direction; and wherein the direction cost comprises a first direction cost associated with traversing terrain is the less suitable direction for the processing assembly, a second direction cost associated with harvesting crops in the less suitable direction relative to a crop leaning direction, or a combination thereof.

6. The planning system of claim 1, wherein the outlet positioning cost comprises a turning cost associated with turning the autonomous work vehicle system in a direction that positions the product outlet over the unprocessed region of the field.

7. The planning system of claim 1, wherein the controller is configured to determine the partition order based at least in part on a geometry of the field.

8. The planning system of claim 1, wherein the controller is configured to determine the target time based on weather conditions at the field.

9. A planning system for a plurality of autonomous work vehicle systems, comprising:
a controller comprising a memory and a processor, wherein the controller is configured to determine a plan for the plurality of autonomous work vehicle systems by reducing a cost function, and to output one or more signals indicative of the plan, instructions to execute the plan, or a combination thereof;
wherein the plan includes a route of each autonomous work vehicle system of the plurality of autonomous work vehicle systems through a field, and the cost function includes a plurality of costs associated with operation of the plurality of autonomous work vehicle systems; and wherein the plurality of costs comprises a positioning cost associated with positioning a processing assembly in a processed region of the field, a product management cost associated with inefficient management of product storage, an outlet positioning cost associated with positioning a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, a passing cost associated with at least two autonomous work vehicle systems of the plurality of autonomous work vehicle systems passing one another along adjacent swaths, an operation order cost associated with performing operations out of order, or a combination thereof.

10. The planning system of claim 9, wherein a first autonomous work vehicle system of the plurality of autonomous work vehicle systems is configured to perform a first operation, a second autonomous work vehicle system of the plurality of autonomous work vehicle systems is configured to perform a second operation, different than the first operation, the first operation is configured to be performed before the second operation, and the operation order cost is associated with performing the second operation before the first operation.

11. The planning system of claim 9, wherein the plurality of costs comprises an obstacle management cost associated with traversing an obstacle, and wherein the obstacle management cost comprises a first obstacle management cost associated with traversing a route-blocking obstacle, a second obstacle management cost associated with traversing an operation-interfering obstacle, or a combination thereof.

12. The planning system of claim 9, wherein the product management cost comprises a first product management cost associated with depleting a supply of product for application to the field, a second product management cost associated with reaching a capacity of a storage compartment, or a combination thereof.

13. The planning system of claim 9, wherein the plurality of costs comprises a direction cost associated with traversing the field in a less suitable direction, and wherein the direction cost comprises a first direction cost associated with traversing terrain is the less suitable direction for the processing assembly, a second direction cost associated with harvesting crops in the less suitable direction relative to a crop leaning direction, or a combination thereof.

14. The planning system of claim 9, wherein the outlet positioning cost comprises a turning cost associated with turning the autonomous work vehicle system in a direction that positions the product outlet over the unprocessed region of the field.

15. The planning system of claim 9, wherein the controller is configured to determine the partition order based at least in part on a geometry of the field.

16. One or more tangible, non-transitory, machine-readable media comprise instructions configured to cause a processor to:
determine a plan for an autonomous work vehicle system by reducing a cost function; and output one or more signals indicative of the plan, instructions to execute the plan, or a combination thereof;

wherein the plan includes a route of the autonomous work vehicle system through a field, and the cost function includes a plurality of costs associated with operation of the autonomous work vehicle system; and wherein the plurality of costs comprises a positioning cost associated with positioning a processing assembly in a processed region of the field, a product management cost associated with inefficient management of product storage, an outlet positioning cost associated with positioning a product outlet over an unprocessed region of the field, a compaction cost associated with not traversing a compaction lane, a partition order cost associated with not following a determined partition order, an entry point cost associated with not engaging the processing assembly at a field entry point, an exit point cost associated with not disengaging the processing assembly at a field exit point, an initiation time cost associated with not initiating the plan at a target time, or a combination thereof.

17. The one or more tangible, non-transitory, machine-readable media of claim 16, wherein the plurality of costs comprises an obstacle management cost associated with traversing an obstacle, and wherein the obstacle management cost comprises a first obstacle management cost associated with traversing a route-blocking obstacle, a second obstacle management cost associated with traversing an operation-interfering obstacle, or a combination thereof.

18. The one or more tangible, non-transitory, machine-readable media of claim 16, wherein the product management cost comprises a first product management coat associated with depleting a supply of product for application to the field, a second product management cost associated with reaching a capacity of a storage compartment, or a combination thereof.

19. The one or more tangible, non-transitory, machine-readable media of claim 16, wherein the plurality of costs comprises a direction cost associated with traversing the field in a less suitable direction, and wherein the direction cost comprises a first direction cost associated with traversing terrain is the less suitable direction for the processing assembly, a second direction cost associated with harvesting crops in the less suitable direction relative to a crop leaning direction, or a combination thereof.

20. The one or more tangible, non-transitory, machine-readable media of claim 16, wherein the outlet positioning cost comprises a turning cost associated with turning the autonomous work vehicle system in a direction that positions the product outlet over the unprocessed region of the field.

* * * * *